2,932,633

CATALYTIC CONVERSION AND CATALYSTS

Omar O. Juveland, Chicago, Herbert N. Friedlander, Homewood, and Edmund Field, Chicago, Ill., assignors to Standard Oil Company, Chicago, Ill., a corporation of Indiana No Drawing. Application March 28, 1956
Serial No. 574,365

11 Claims. (Cl. 260—94.9)

This invention relates to novel polymerization catalysts and polymerization processes. The present invention provides processes suitable for the polymerization of compounds containing ethylenic unsaturation. It is especially suitable for the homo- or hetero-polymerization of hydrocarbons containing ethylenic unsaturation, particularly vinyl monoolefinic hydrocarbons. By the process of the present invention, unbranched, normally gaseous 1-alkenes can be polymerized to yield normally solid materials of high molecular weight, especially highly crystalline, resinous materials.

One object of our invention is to provide novel catalysts for the polymerization of organic compounds containing ethylenic unsaturation. More specific objects are to provide novel catalysts and processes for the polymerization of vinyl monoolefinic hydrocarbons. An additional object is to provide novel catalysts and processes for the polymerization of unbranched, normally gaseous 1-alkenes to produce relatively dense, resinous polymers. Yet another object is to provide new catalysts and processes for the polymerization of ethylene and/or other normally gaseous, unbranched 1-alkenes to produce solid polymers having high molecular weights and high degrees of crystallinity. A further object is to provide processes for the production of isotactic polymers from propylene, 1-butene, styrene and other monomers which offer the possibility of yielding isotactic polymers (note G. Natta, J. Polymer Sci. 25, 143–154 (April 1955)).

In accordance with our invention, organic compounds containing ethylenic unsaturation are polymerized readily under relatively mild polymerization conditions with catalysts (hereinafter specified) and catalyst promoters to produce additional polymers, and in many cases, normally solid polymers. As catalyst promoters, we use mono-aliphatic-substituted or tri-aliphatic-substituted ammonias, especially alkyl amines, of the designated classes, in small proportions based on the weight of the catalyst.

The catalysts employed in the polymerization process are prepared by mixing a salt of a transition metal selected from Groups 4, 5, 6 or 8 of the Mendeléef Periodic Table with an alkali reagent selected from the group consisting of the alkali metals or their hydrides or hydrocarbon derivatives, or a mixture of two or more of the aforesaid alkali reagents. The admixture can be effected in an inert liquid reaction medium such as a saturated hydrocarbon. The admixture of the metal salt and alkali reagent appears to result in partial reduction of the positive valence state of the metal contained in said salt; it also appears that the formation of more or less highly colored complexes occurs between the partially reduced salts and alkali reagents and/or other interaction products.

The molar ratios of polyvalent metal salt and alkali reagent can generally be varied broadly over the range of about 0.1 to about 10, more or less. It is preferred to use a molar excess of reducing agent (the alkali reagent) with respect to the polyvalent metal salt. In some cases the interaction proceeds at an appreciable or even high rate at room temperature; however, the temperature can be varied, depending on the specific reactants, between about −20° C. and about 300° C. The admixture can be effected in the presence or absence of the monomer or mixture of monomers which is to be polymerized. The resultant complex can be stabilized by adding small proportions of a highly reactive olefin thereto, e.g. styrene, indene or the like.

We have found that the polymerization activity of the catalyst prepared by reaction of alkali reagents with the specified metal salts can be substantially increased (as evidenced by increased yields of polymer under otherwise comparable conditions) by the inclusion of a primary or tertiary aliphatic amine in the reaction zone. The proportion of amine which is employed can vary from about 0.01 to about 20% by weight, based on the weight of the alkali reagent which is employed in the preparation of the catalyst, but is usually within the range of about 1 to about 10 weight percent, preferably about 3 to about 6 weight percent. The nitrogen-containing promoter can be introduced in one or a plurality of charges, intermittently or continuously in the step of catalyst preparation; with the polymerization feed stock, as a separate charge to the reaction zone before or during polymerization.

Polymerization can be effected at selected temperatures which vary in accordance with the polymerization activity of the specific monomer(s), catalysts, amine promoter, desired reaction rate and the type of product which is desired. The selected polymerization temperatures generally fall within the range of about −40° C. to about 300° C., more often about 0° C. to about 250° C., say about 25° C. to 75° C.

The preparation of catalysts and the polymerization are preferably effected in the absence of impurities which react with and consume the catalysts or the components of the catalytic mixture, such impurities being oxygen, carbon dioxide, water, etc.

Polymerization can be effected at atmospheric pressure or even lower pressures, but it may be advantageous to use superatmospheric pressures in order to obtain desirable monomer concentrations in contact with the catalysts. Thus, the polymerization can be conducted at pressures up to 10,000 p.s.i. or even higher pressures. Usually polymerization is effected at pressures between about 50 and about 2000 p.s.i.a.

The weight ratio of catalyst mixture to monomer can generally be varied in the range of about 0.01 to about 10% by weight, for example, about 0.1 to about 5 weight percent; even 100 weight percent catalyst can be used in flow operations.

Polymerization can be effected by contacting the unsaturated feed stock at the selected temperature and pressure with the mixture produced by the interaction of the catalyst components or with individual components of said mixture which exhibit catalytic activity.

Polymerization is preferably performed in the presence of various reaction media which remain liquid under the selected polymerization conditions of temperature and pressure. We prefer to employ relatively inert liquid reaction media such as saturated hydrocarbons, aromatic hydrocarbons, relatively unreactive alkenes or cycloalkenes, perfluorocarbons, chloroaromatics or mixtures of suitable liquids.

Suitable agitation of the catalyst and monomer(s) is provided to secure effective contacting by means which are well known. Removal of the heat generated in polymerization can be effected by known means.

Through the present process, we can convert ethylene to wax-like homopolymers having an approximate specific viscosity ($\times 10^5$) between about 1000 and 10,000 and tough, resinous ethylene homopolymers having an approximate specific viscosity ($\times 10^5$) of 10,000 to more than 300,000. Propylene can be polymerized by the present process to normally solid materials which soften at temperatures well above room temperature, for example, at least about 75° C. or even much higher temperatures (in some cases exceeding the melting points of high molecular weight solid polyethylenes).

The following examples are provided to illustrate the invention but not unduly to limit its broad scope. The preparation of catalysts and polymerizations were carried out in round bottom glass flasks of 100 cc. capacity which were in each instance charged with 40 ml. of dry n-heptane. Then a fine dispersion of 0.62 g. sodium in an inert hydrocarbon medium was introduced into the flask, followed by the addition of 0.86 g. TiCl$_4$. Thereafter the amine promoter was introduced. All steps of catalyst preparation and polymerization were conducted with vigorous stirring of the contents of the reactor at about 100 r.p.m. The polymerization temperature ranged between 25° C. and 35° C. Ethylene was pressured into the reactors at 50 p.s.i.g. and was repressured into the reactors intermittently as it was consumed in polymerization. In each instance the reaction period was 20 hours.

Melt viscosities of the polymers were measured in poises at 145° C. by the method of Dienes and Klemm, J. Appl. Physics 17, 458–71 (1946). Densities at 24° C.

TABLE

*Ethylene polymerization*

| Run | Amine, g. | | Yield of Polymer, g. | Polymer Properties |
|---|---|---|---|---|
| 1 | None | | 0.96 | $d=0.9358$; M.V.$=1.7 \times 10^8$ |
| 2 | n-Hexylamine | 0.09 | 1.08 | $d=0.9473$; M.V.$=2.1 \times 10^9$ |
| 3 | tri-n-Butyl amine | 0.17 | 2.8 | $d=0.9352$; M.V.$=9.85 \times 10^7$ |
| 4 | Diethyl amine | 0.06 | 0.38 | |
| 5 | Piperidine | 0.08 | 0.70 | |
| 6 | n-Butyramide | 0.08 | 0.06 | |
| 7 | n-Butyronitrile | 0.06 | 0.46 | |

In run 1, Na—TiCl$_4$ catalysts were used without an amine promoter. In run 2, a typical primary aliphatic amine was added in a very small proportion and was found to increase the polymer yield. In run 3, a typical tertiary aliphatic amine was added as a promoter. Surprisingly, secondary amines were found to reduce the polymer yield (runs 4 and 5). Neutral organic nitrogen compounds (runs 6 and 7) reduced the yield of polymer.

Our invention can be substantially extended from the specific illustrations thereof which have been supplied. Thus, the novel catalysts can be applied to the treatment of any organic compound containing an ethylenic linkage which is susceptible of addition polymerization, for example, the well known vinyl monomers, which need not be specified in detail herein (cf. C. E. Schildknecht, "Vinyl and Related Polymers," John Wiley & Sons, N.Y. (1952)). A particularly important application of the catalysts of the present invention is for the polymerization of vinyl monoolefinic hydrocarbons, the term "vinyl" being defined as CH$_2$=CH— (C.A. 39, 5966 (1945)). The vinyl monoolefinic hydrocarbons have the general formula $$RCH=CH_2$$

wherein R is selected from the group consisting of hydrogen and saturated monovalent hydrocarbon radicals, i.e. hydrocarbon radicals containing no ethylenic unsaturation, viz. alkyl, cycloalkyl and aryl radicals, which generic classes also include the subgeneric classes of radicals such as arylalkyl, cycloalkylaryl, alkylcycloalkyl, arylcycloalkyl, cycloalkylaryl and alkylaryl.

Vinyl alkene monomers are important feed stocks for use in the present polymerization process because of their availability in large volume and reasonable cost. These feed stocks have the generic formula $$RCH=CH_2$$

wherein R is hydrogen of an alkyl radical. Specifically, suitable vinyl alkene feed stocks comprise ethylene, propylene, 1-butene, 1-pentene, 1-hexene and mixtures of one or more of these alkenes, or the like.

The process of the present invention can also be applied to polyolefinic hydrocarbons, especially conjugated alkadienes such as 1,3-butadiene, isoprene, piperylene, 4-methyl-1,3-pentadiene, or to non-conjugated alkadienes such as 1,5-hexadiene or the like. These monomers can be polymerized alone or in mixtures with other vinyl monomers, especially vinyl monoolefinic hydrocarbons such as ethylene, propylene, styrene and the like, employing desired proportions of each monomer in a composite feed stock.

Vinyl arenes are suitable feed stocks, used alone or as comonomers with vinyl alkenes or conjugated alkadienes. Examples of vinyl arenes are styrene, nuclearly alkylated (especially methylated) styrenes, nuclearly chlorinated styrenes and the like.

The invention can also be applied to such highly reactive olefins as indene and the like. The invention may be applied to 2-butene, 2-pentene, isobutylene, 2-methyl-2-butene, 5-methyl-1-hexene, tetrafluoroethylene, trifluorochloroethylene, t-butylethylene and the like, these olefins being employed as the sole monomer or in minor proportions upon some other monomer such as ethylene, propylene or the like.

It will be understood that the various monomers are not equivalents for the purposes of our invention and vastly different polymers can be secured by varying the feed stock. Our invention is especially useful and yields unexpected results when the monomer is a normally gaseous, unbranched 1-alkene, especially ethylene and/or propylene.

In the preparation of suitable polymerization catalysts, any of the alkali metals or alloys, or mixtures of alkali metals, or hydrides or hydrocarbon derivatives of alkali metals can be employed. Suitable alkali metal alloys include the amalgams, Na—K liquid alloys, lead-sodium alloys, e.g. PbNa$_4$, and the like. The alkali metals are lithium, sodium, potassium, rubidium and cesium; they form hydrides having the general formula MH, wherein M represents an alkali metal. The alkali metals form a variety of hydrocarbon derivatives having the general formula MR, wherein R represents a monovalent hydrocarbon radical which may be saturated or unsaturated, for example, an alkyl, aryl, aralkyl, alkaryl, cycloalkyl, conjugated cyclodienyl, and other hydrocarbon radicals. Suitable alkyl radicals include methyl, ethyl, propyl, isopropyl, butyl, isobutyl, amyl, octyl, dodecyl, hexadecyl, octadecyl, eicosyl, and the like, for example, as in ethyl sodium, methyl lithium, butyl lithium, methyl sodium, octyl potassium. Other suitable alkali metal compounds include isopropyl potassium, benzyl sodium, sodium acetylides, allyl sodium, etc. Organoalkali compounds can be prepared by conventional techniques in situ, e.g., by the reaction of an alkali metal with a highly reactive metal alkyl such as a dialkyl mercury, a dialkyl zinc or the like; by the reaction of alkyl or allylic halides with alkali metal, etc.

Salts of the following metals can be used in the preparation of polymer catalysts for the purposes of our invention: Ti, Zr, Hf, Th, V, Nb, Ta, U, Cr, Mo, W, Mn, Fe, Co, Ni, Ru, Rh, Pd, Os, Ir, Pt or mixtures of salts of said metals. We can employ the metal salts of various mineral acids, for example, the hydrohalogen acids; oxyhalides, e.g., titanyl chloride or vanadyl chloride and the like; salts of acids of phosphorus, sulfur, nitrogen, etc. We may also use the specified metal cyanides, cyanates, isocyanates, thiocyanates, isothiocyanates, azides, etc. The salts of carboxylic or sulfonic acids may also be used.

Also, we may use metal derivatives, classified herein as salts, having the formula $M(OR)_n$, wherein M represents the polyvalent metal, R( is an alkyl or aryl radical, and $n$ is the valence of M, for example, $Ti(OC_2H_5)_4$, $Ti(OC_3H_7)_4$, $Ti(OC_4H_9)_4$, tetra-2-ethylhexyl titanate, tetrastearyl titanate, tetraphenyl zirconate and the like, for example, the metal derivatives of the enol forms of acetylacetone, acetoacetic ester and the like.

In addition to or in lieu of the aforesaid metal salts, we may employ freshly precipitated oxides or hydroxides of said metals, which can be prepared by techniques which are well known in inorganic chemistry.

It will be understool that the various alkali reagents do not yield precisely the same results and the same is true of the various metal salts which may be employed to prepare catalysts for use in our invention. The broad variety of reagents which can be used to prepare active polymerization catalysts affords great flexibility in our invention.

The preparation of the catalyst can be effected in the presence of various solid materials, such as carbon, silica, alumina, bauxite, fluorided alumina, synthetic or natural aluminosilicates, magnesia, titania, zirconia, powdered aluminum fluoride, sodium fluoride, sodium chloride, cryolite or the like. The added solid materials can comprise from about 10 to 2000 weight percent, based on the weight of the materials which are allowed to react to form the polymerization catalysts.

In some cases, maximum catalytic activity can be attained by depositiing or sorbing the polyvalent metal salt on the surface of a solid material, e.g. by stirring a solution or dispersion of said polyvalent metal salt with the finely-divided solid support, thereafter adding the alkali reagent to effect partial reduction of said salt and the formation of an extended, supported catalyst.

A variety of amino compounds can be used as catalyst promoters for the purposes of the present invention. Thus, various amino derivatives of hydrocarbons, carboxylic acids, esters of carboxylic acids, salts of carboxylic acids, salts of sulfonic acids, acyclic or cyclic ethers, aromatic hydroxy compounds and the like can be used. The selected amino compounds are mono- substituted or tri-substituted ammonias, which is to say, primary or tertiary amino compounds, wherein the substituent(s) has aliphatic character. Because of their availability in substantial quantities in large variety on the market at reasonable prices, we prefer to employ amines as such, i.e., compounds containing no other functional group in addition to the amine function. In particular, we prefer to employ primary and tertiary aliphatic amines, which have the formula $$R_xNH_y$$

wherein R is an aliphatic radical, e.g., an alkyl or cycloalkyl radical; $x$ is 1 or 3 and $x$ plus $y$ equals 3. Examples of primary aliphatic amines are, e.g., methylamine, ethylamine, n-propylamine, isopropylamine, allylamine, n-butylamine, sec-butylamine, t-butylamine, crotylamine, n-amylamine, 2-aminopentane, 3-aminopentane, t-amylamine, n-hexylamine, n-heptylamine, hexadecylamine, octadecylamine, beta-cyclohexylethylamine, beta-phenethylamine, mixtures thereof or the like.

We may also employ cycloalkyl primary amines such as cyclopentylamine, methylcyclopentylamine, cyclohexylamine, methylcyclohexylamine and the like.

Examples of tertiary aliphatic amines which can be employed include trimethylamine, N,N-diethylmethylamine, triethylamine, N,N-dimethyl-butylamine, N,N-diethylisopropylamine, tri-n-amylamine, tri-n-butylamine, N,N-diethyl-hexylamine. We may also employ N,N-dialkyl-cycloalkylamines wherein the cycloalkyl group is cyclopentyl or cyclohexyl and the alkyl group is one or a plurality of the following: ethyl, methyl, propyl, amyl, dodecyl, hexadecyl, octadecyl or the like.

Primary or tertiary polyamines may also be employed for the purposes of our invention, for example, ethylene diamine, diethyl triamine, triethylene, tetraamine, tetraethylene pentamine, 1,5-diaminopentane and the like.

We may also employ alkanolamines or cycloalkanolamines such as ethanolamine, propanolamine, N,N-dimethyl ethanolamine, N,N-diethyl ethanolamine, p-hydroxycyclohexylamine, their mixtures or the like.

Amino ethers can be employed for the purposes of this invention, for example, N-alkyl-morpholines, N-cycloalkyl-morpholines or the like.

A wide variety of amino acids or their esters or salts can be employed in which the nitrogen atom of the amine is either a mono-substituted or tri-subtituted ammonia.

The polymeric products produced by the processes encompassed within the scope of our invention can be subjected to a variety of treatments designed to remove all or part of the catalytic materials therefrom. Thus the polymers can be washed with methanol, alcoholic alkalies, or the like in order to convert halide salts to the corresponding metal hydroxides.

The polymer products can be dissolved in hot solvents, for example in unreactive hydrocarbons such as saturated or aromatic hydrocarbons, and the resultant solutions can be treated to separate polymer having relatively low content of material derived from the catalyst components. Thus hot hydrocarbon solutions of polymer can be subjected to the action of various hydrolytic agents to precipitate metal hydroxides which can then be separated from the remaining solution by centrifuging, decantation, filtration or other means. Alternatively, the hot hydrocarbon solution of polymer can be cooled or treated with precipitants or antisolvents such as acetone, methanol or the like to precipitate a small proportion, say up to about 5 weight percent of the solute polymer, which precipitate contains a very large proportion of the inorganic materials originally present in the polymer. The solvent can be recovered from the aforementioned operations and can be reused.

A desirable method for working up normally solid polymers of ethylene is to prepare a hot solution thereof in a normally liquid alkane, particularly in the $C_6$–$C_{12}$ range, having a concentration of the order of 2–3 weight percent, thereafter to filter said solution through a conventional filter medium to remove suspended particles derived from the polymerization catalyst, thereafter to contact the filtrate with an absorbent filter aid in order to effect selective adsorption of colloidal polymer particles from the hot filtrate, thereafter to filter the hot filtrate and treat it to recover the purified ethylene polymer remaining in solution. This object can be achieved simply by cooling the filtrate to produce a precipitate of white polyethylene which is readily filterable by conventional methods. Treatments with filter aid, as described above, may be optional or desirable, depending upon the specific circumstances.

The polymers of the present invention can be used or treated as the polymers whose preparation is described in U.S. Patent 2,691,647 of Edmund Field and Morris Feller, granted October 12, 1954.

Having thus described our invention, what we claim is:

1. In a process for the preparation of a normally solid polymer which comprises contacting a feedstock containing at least one unbranched normally gaseous 1-alkene with a polymerization catalyst prepared by admixing an alkali metal with a tetrahalide of a metal selected from the group consisting of titanium, zirconium and hafnium, the improvement of effecting said contacting under polymerization conditions in the presence of an added amine selected from the class consisting of primary and tertiary alkyl amines.

2. The process of claim 1 wherein said feed stock comprises ethylene.

3. A novel composition consisting essentially of the reaction product secured by admixing at least about 2 gram atomic weights of an alkali metal with between about 0.1 and about 1 gram molecular weight of a titanium tetrahalide and between about 0.01 and about 20% by weight, based on said alkali reagent, of an amine selected from the class consisting of primary and tertiary alkyl amines.

4. A novel composition consisting essentially of the reaction product secured by admixing at least about 2 gram atomic weights of an alkali metal with between about 0.02 and about 5 gram molecular weights of a titanium tetrahalide and between about 0.01 and about 20% by weight, based on the weight of said alkali metal, of an amine selected from the group consisting of primary and tertiary alkyl amines.

5. The composition of claim 4 wherein said alkali metal is sodium, said titanium tetrahalide is a titanium tetrachloride and said amine is a primary alkyl amine.

6. The composition of claim 4 wherein said alkali metal is sodium, said titanium tetrahalide is a titanium tetrachloride and said amine is a tertiary alkyl amine.

7. In a process for the preparation of a normally solid polymer by contacting ethylene under polymerization conditions with a catalytic agent prepared by mixing an alkali metal with titanium tetrachloride the improvement of effecting said contacting in the presence of an added amine selected from the class consisting of primary and tertiary alkyl amines in a proportion sufficient to effect substantial promotion of the activity of said catalytic agent and recovering a resinous polyethylene thus produced.

8. The process of claim 7 wherein said alkali metal is sodium.

9. The process of claim 7 wherein said alkali metal is sodium and said added amine is n-hexylamine.

10. The process of claim 9 wherein said alkali metal is sodium and said added amine is tri-n-butylamine.

11. A novel composition consisting essentially of the reaction product secured by admixing an alkali metal with a tetrahalide of a metal selected from the group consisting of titanium, zirconium and hafnium and between about 0.01 and about 20% by weight based on said alkali metal of an amine selected from the class consisting of primary and tertiary alkyl amines.

References Cited in the file of this patent

UNITED STATES PATENTS

| 2,478,066 | Van Peski | Aug. 2, 1949 |
| 2,684,954 | Miller | July 27, 1954 |
| 2,691,647 | Field et al. | Oct. 12, 1954 |

FOREIGN PATENTS

| 538,782 | Belgium | Dec. 6, 1955 |